(12) United States Patent
Libin et al.

(10) Patent No.: US 9,519,725 B2
(45) Date of Patent: Dec. 13, 2016

(54) SITE CONTENT CLIPPING CONTROL

(75) Inventors: Phil Libin, San Jose, CA (US); Phil Constantinou, San Francisco, CA (US); Dmitry Stavisky, Menlo Park, CA (US); Alex Pachikov, Mountain View, CA (US); Pavel Skaldin, San Francisco, CA (US); Andrew Sinkov, San Francisco, CA (US)

(73) Assignee: Evernote Corporation, Redwood City, CA (US)

( * ) Notice: Subject to any disclaimer, the term of this patent is extended or adjusted under 35 U.S.C. 154(b) by 272 days.

(21) Appl. No.: 13/227,798

(22) Filed: Sep. 8, 2011

(65) Prior Publication Data

US 2012/0060098 A1 Mar. 8, 2012

Related U.S. Application Data

(60) Provisional application No. 61/380,924, filed on Sep. 8, 2010.

(51) Int. Cl.
*G06F 3/048* (2013.01)
*G06F 17/30* (2006.01)

(52) U.S. Cl.
CPC ............... *G06F 17/30884* (2013.01)

(58) Field of Classification Search
CPC .................................. G06F 17/3089
USPC ............................................ 715/744
See application file for complete search history.

(56) References Cited

U.S. PATENT DOCUMENTS

| 5,983,218 A | 11/1999 | Syeda-Mahmood |
| 6,029,161 A | 2/2000 | Lang et al. |
| 6,078,916 A | 6/2000 | Culliss |
| 6,182,668 B1 | 2/2001 | Tweden et al. |
| 6,314,420 B1 | 11/2001 | Lang et al. |
| 6,701,311 B2 | 3/2004 | Biebesheimer et al. |
| 6,775,664 B2 | 8/2004 | Lang et al. |
| 6,799,184 B2 | 9/2004 | Bhatt et al. |

(Continued)

FOREIGN PATENT DOCUMENTS

| CN | 101031915 A | 9/2007 |
| JP | 2007-026375 A | 2/2007 |

(Continued)

OTHER PUBLICATIONS

"Evernote for Mac: User Guide," Evernote Corporation, 2008-2010, 35 pp.

*Primary Examiner* — Peiyong Weng
(74) *Attorney, Agent, or Firm* — Muirhead and Saturnelli, LLC (57) ABSTRACT

A system is provided for presenting users with relevant personalized and/or customized information whenever a visitor visits a website or performs an internet search. The described system described herein advantageously provides for the saving (clipping) of website information as an integrated part of a visitor's browsing experience. The content of the website information that is clipped may be advantageously controlled by a website owner/publisher. Using website clips, identified as "notes," previously stored by a visitor, currently displayed website content may be accordingly modified in connection with identified relevant notes and/or a notification may be displayed on the current website for a particular visitor identifying stored relevant notes of the visitor.

24 Claims, 8 Drawing Sheets

(56) References Cited

U.S. PATENT DOCUMENTS

| | | |
|---|---|---|
| 6,904,426 B2 | 6/2005 | Smith |
| 6,978,420 B2 | 12/2005 | Ching |
| 7,062,534 B1 | 6/2006 | Henry et al. |
| 7,249,124 B2 | 7/2007 | Sasaki et al. |
| 7,275,063 B2 | 9/2007 | Horn |
| 7,356,761 B2 | 4/2008 | Karadimitriou et al. |
| 7,383,252 B2 | 6/2008 | Soogoor |
| 7,765,176 B2 | 7/2010 | Simmons et al. |
| 7,840,619 B2 | 11/2010 | Horn |
| 7,984,050 B2 | 7/2011 | Lee et al. |
| 8,010,581 B2 | 8/2011 | Bechtel et al. |
| 8,136,027 B2 | 3/2012 | Underwood et al. |
| 8,156,128 B2 | 4/2012 | Ramer et al. |
| 8,219,577 B2 | 7/2012 | Nakano et al. |
| 2001/0042010 A1* | 11/2001 | Hassell ............... 705/14 |
| 2002/0173971 A1 | 11/2002 | Stirpe et al. |
| 2006/0074836 A1 | 4/2006 | Gardner et al. |
| 2006/0106847 A1 | 5/2006 | Eckardt et al. |
| 2006/0200751 A1 | 9/2006 | Underwood et al. |
| 2006/0287985 A1 | 12/2006 | Castro et al. |
| 2006/0294199 A1 | 12/2006 | Bertholf |
| 2007/0266342 A1* | 11/2007 | Chang ............... G06F 17/30867 715/810 |
| 2008/0040347 A1 | 2/2008 | Potok et al. |
| 2008/0201650 A1* | 8/2008 | Lemay et al. ............ 715/763 |
| 2009/0006988 A1* | 1/2009 | Lu ................. G06Q 30/0603 715/762 |
| 2010/0057801 A1 | 3/2010 | Ramer et al. |
| 2010/0094878 A1 | 4/2010 | Soroca et al. |

FOREIGN PATENT DOCUMENTS

| | | |
|---|---|---|
| JP | 2008-226202 A | 9/2008 |
| JP | 2008-574119 | 12/2008 |
| JP | 2010-66870 | 3/2010 |
| KR | 10-2008-0024208 | 3/2008 |
| KR | 10-2008-0087188 A | 10/2008 |
| WO | WO 2007/001974 A1 | 1/2007 |

* cited by examiner

SITE CONTENT CLIPPING CONTROL

RELATED APPLICATIONS

This application claims priority to U.S. Prov. App. No. 61/380,924, filed Sep. 8, 2010, and entitled "Method of Combining Private and Public Search," which is incorporated herein by reference.

TECHNICAL FIELD

This application is directed to the field of storing, searching and presenting information, particularly in connection with websites.

BACKGROUND OF THE INVENTION

Systems and services exist that are designed to help people remember personal information. An example of such a service is Evernote provided by Evernote Corporation of Mountain View, Calif. Some examples of the types of information that can be stored in Evernote are: clips from web sites, business cards, emails, documents, meeting notes, reminders, photographs (personal, landscapes, wine labels, etc.), wish-lists, receipts, audio notes, etc. Evernote lets users capture and retrieve any type of information using custom software running on a desktop or laptop computer, telephone, tablet, PDA or smartphone. Alternatively, Evernote also has a web-application which gives users access to their stored information without having to install any software. Once information is in Evernote, users can search for it using any combination of time, date, geo-location, tags, content attributes or keywords. Evernote also automatically identifies and indexes the printed and handwritten words inside of images. The general name for a piece of information in Evernote is a "note."

Accordingly, it would be desirable to provide systems and techniques that advantageously facilitate the searching for and presenting of relevant notes in connection with other website content accessed by a visitor and that facilitate control by the site owner of website content clipped to a note by the visitor.

SUMMARY OF THE INVENTION

According to the system described herein, a method for presenting information on a website includes extracting information, as extracted information, from the website. A database may be searched for relevant information that is relevant to the extracted information from the website. The relevant information may be stored in the database prior to the extracting of the extracted information from the website. The relevant information is presented in a manner that associates the relevant information with content displayed on the website. The extracted information may be a portion of the site address of the website. The website may be an interface to a search engine, and the extracted information may correspond to a search query input to the search engine. The manner in which the relevant information is displayed may include modifying search results of the search engine in response to the search query. The manner of presenting the relevant information may include displaying a preview of the relevant information in a popup window and/or modifying the site to add and display the relevant information. The method may further include determining whether a visitor has selected the preview in the popup window, and, if the preview is selected, displaying the relevant information corresponding to the preview. The manner of presenting the relevant information may include displaying a notification on the website that the relevant information is available. The database may be maintained by a service, and the relevant information stored in the database may include content clipped from at least one other website. The extracted information may be automatically extracted from the website and/or may be extracted after an activation action by a visitor to the website.

According further to the system described herein, a non-transitory computer readable medium stores software that presents information on a website. The software may include executable code that extracts information, as extracted information, from the website. Executable code may be provided that searches a database for relevant information that is relevant to the extracted information from the website. The relevant information may be stored in the database prior to the extracting of the extracted information from the website. Executable code may be provided that presents the relevant information in a manner that links the relevant information to content displayed on the website. The extracted information may be a portion of the site address of the website. The website may be an interface to a search engine, and the extracted information may correspond to a search query input to the search engine. The manner in which the relevant information is displayed may include modifying search results of the search engine in response to the search query. The manner of presenting the relevant information may include displaying a preview of the relevant information in a popup window and/or modifying the site to add and display the relevant information. The method may further include determining whether a visitor has selected the preview in the popup window, and, if the preview is selected, displaying the relevant information corresponding to the preview. The manner of presenting the relevant information may include displaying a notification on the website that the relevant information is available. The database may be maintained by a service, and the relevant information stored in the database may include content clipped from at least one other website. The extracted information may be automatically extracted from the website and/or may be extracted after an activation action by a visitor to the website.

According to the system described herein, a method for controlling information stored in response to a content clipping process on a website is provided. A button may be configured for the website that activates the content clipping process. At least one parameter may be associated with the button, and the at least one parameter may include a content parameter for identifying content on the website in response to activation of the content clipping process. The content may be stored in a presentable form in a database. The button may be embedded on the website. The presentable form of the content on the website that is identified in response to activation of the content clipping process may be controlled by a site owner of the website by controlling the at least one parameter. The database may be maintained by a service to which a visitor to the website subscribes. The visitor may activate the embedded button on the website to activate the content clipping process and store the presentable form of the content in the database. The presentable form of the stored content in the database may be subsequently accessible by the visitor. The at least one parameter may further include a parameter for organizing the content in the presentable form that is stored in the database. Configuring the button may include configuring visual characteristics of the button. The presentable form of the content may be the same as a printable view of the content. The at least one parameter may include the content parameter and at least one other parameter for organizing the content. The at least one other parameter may be controllable by a visitor to the website, and the content parameter may be exclusively controlled by a site owner of the website.

According further to the system described herein, a non-transitory computer readable medium stores software for controlling information stored in response to a content clipping process on a website. The software may include executable code that configures a button for the website that activates the content clipping process. Executable code may be provided that configures at least one parameter associated with the button, wherein the at least one parameter includes a content parameter for identifying content on the website in response to activation of the content clipping process, the content being stored in a presentable form in a database. Executable code may be provided that embeds the button on the website. The presentable form of the content on the website that is identified in response to activation of the content clipping process may be controlled by a site owner of the website by controlling the at least one parameter. The database may be maintained by a service to which a visitor to the website subscribes. The visitor may activate the embedded button on the website to activate the content clipping process and store the presentable form of the content in the database. The presentable form of the stored content in the database may be subsequently accessible by the visitor. The at least one parameter may further include a parameter for organizing the content in the presentable form that is stored in the database. Configuring the button may include configuring visual characteristics of the button. The presentable form of the content may be the same as a printable view of the content. The at least one parameter may include the content parameter and at least one other parameter for organizing the content. The at least one other parameter may be controllable by a visitor to the website, and the content parameter may be exclusively controlled by a site owner of the website.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides methods for presenting users with relevant personal (private) information, already stored in Evernote and/or other similar services, whenever the users (visitors) visit a public website or perform an Internet search on Google and/or any other search engine. It is particularly noted that website information may be saved as notes using Evernote. The system described herein advantageously provides for the saving of webpages or other website information as an integrated part of a visitor's browsing experience. It should be noted that although the services provided by Evernote are principally discussed in connection with the system described herein, the system described herein may also be used with other services or hardware that perform functions similar to that of the Evernote service/software and/or in connection with other features that are simply present as files on visitors' local computers. Accordingly, any reference herein to "Evernote" should be read as generally applying to similarly-appropriate services and software.

Evernote may store notes in notebooks that are parts of user databases. A main copy of the user database may be stored on one or more network data services. Notes may be synchronized across multiple devices and platforms. The system described herein allows multiple search options across user notes, including keyword searches in text and images, searches for source URLs for notes clipped from websites, searches by location when present, etc. When a visitor visits a website or searches online, the system described herein may enhance site relevance and enhance visitor experiences and productivity by combining published site contents or search results with the notes already stored in the user (visitor) databases, as further discussed in detail elsewhere herein.

In an embodiment of the system described herein, a user/visitor may install a piece of software that may be referred to as an "extension" into their web browser of choice. In another embodiment, the extension (or the functionality it provides) may be pre-installed in appropriate Web browsers. The extension may be visible as, and/or otherwise be activated by, a button or icon in the toolbar or other location of the browser. Whenever the visitor visits any website with their browser, the extension may be activated to check the Evernote account of the visitor for any previously stored notes related to the website or the content on the website. In an embodiment, the extension may operate automatically each time a webpage is visited. Additionally and/or alternatively, in another embodiment, the extension may be activated by the user, for example, by clicking on a button. The extension may operate to determine whether or not a note is related to the site by employing several techniques, including checking to see if the address (URL) of the site is attributed to the note (e.g., meaning that the note was "clipped" from the same site), checking if common keywords appear on both the site and the note, and checking if other people who have previously visited the site also have similar notes, as further discussed elsewhere herein.

Some or all of these methods may be employed each time. If the extension determines that the visitor has one or more notes which are related to the current website, the extension may notify the visitor by: (1) modifying the displayed content of the site in the visitor's web browser by including summary information and links to the visitor's personal notes inside of the public site; (2) displaying a popup window with the summary information and links; and/or (3) displaying a status message or indicator on the extension icon that alerts the visitor that relevant notes are present. The user may then click on the summary information or links in the content or popup window and/or the button of the extension to then display the summary preview of the relevant notes and subsequently allow the user to choose and display a particular note from the summary preview.

In another embodiment, similar functions and effects may be achieved for certain sites without requiring any extensions or user-custom functionality in the Web browser. The publisher or owner of the site (site owner) may embed an "embedded button" (a small piece of JavaScript or similar code) into their website that performs similar actions as the extension discussed elsewhere herein. In an embodiment, the embedded button feature described herein may be referred to as "Evernote Site Memory." The embedded Evernote Site Memory button may provide for the embedding of a mini version of Evernote onto a site owner's website. The embedded button may effectively give the website a memory. In various embodiments, the embedded button of the Evernote Site Memory may provide advantageous memory features in connection with running a blog, news outlet, storefront, a corporate site, a commercial site and/or other type of website.

Figure 1:
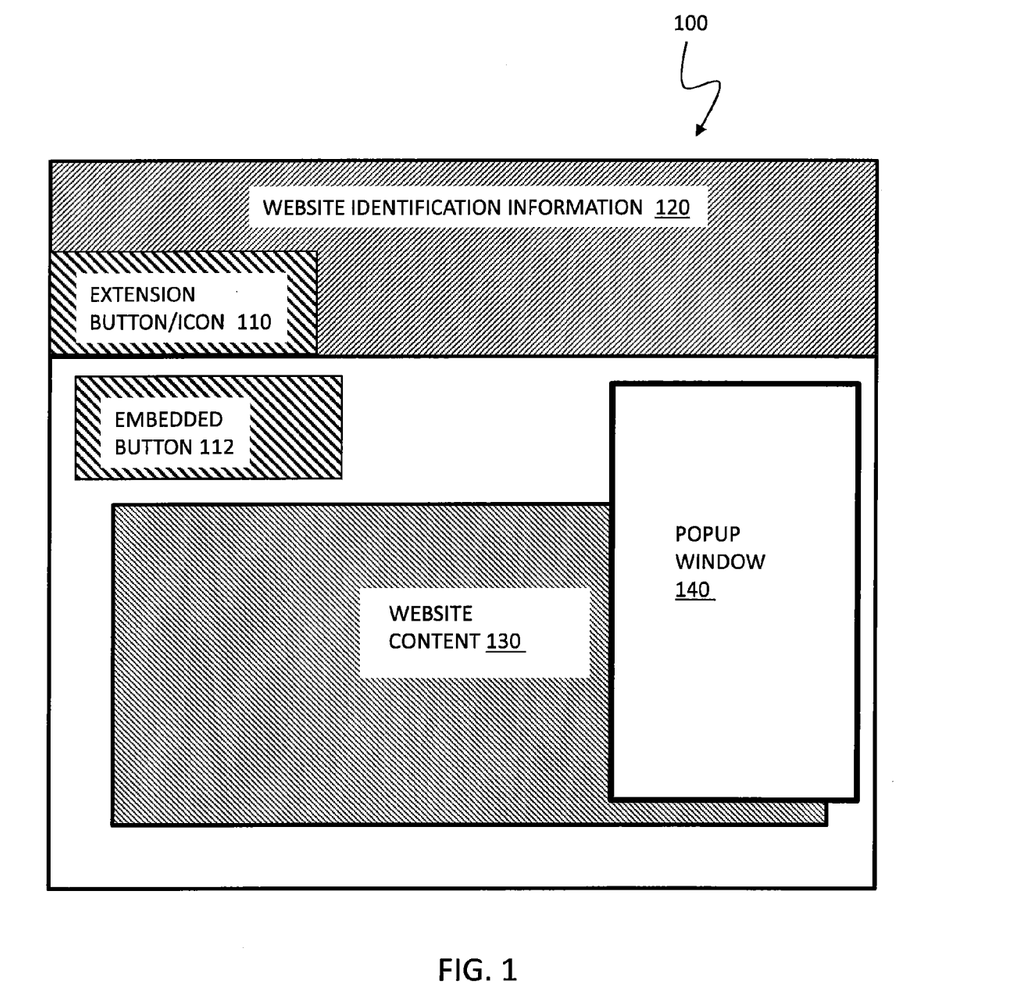
FIG. 1 is a schematic illustration showing a page of a website having site memory features according to an embodiment of the system described herein.

FIG. 1 is a schematic illustration showing a page of a website 100 having site memory features according to an embodiment of the system described herein. The webpage 100 is shown with two site memory features that may be generally referred to as "site memory buttons." The site memory features, according to the system described herein may include an extension button/icon 110 that may be a button installed into a browser and may include an embedded button 112 that is embedded in the webpage 100, as further discussed elsewhere herein. The webpage 100 is shown including website identification information 120 that may include the webpage address (e.g. URL), title and/or other identifying information provided by a browser. The website 100 may further include website content 130 that may include text, images, graphics, media content and/or any other appropriate type of webpage content available on the Internet. In an embodiment, the extension button (or icon) 110 is provided in connection with the use of an extension installed by a visitor for identifying that relevant note information from the Evernote service of the visitor is available to the visitor. In another embodiment, the embedded button 112 may represent an embedded button that is embedded by a site owner in a website. In particular, the embedded button may also be used in connection with clipping, controlled by the site owner, for controlling the information provided as a note using the Evernote service in response to a clipping process activated by the visitor, as further discussed elsewhere herein. It is particular noted that, in various embodiments, a webpage 100 may include only one of the above-noted buttons and/or both of the above-noted buttons. Further illustrated on the webpage 100 is a popup window 140 that may provide site memory information according to an embodiment the system described herein.

According to the system described herein, the popup window 140 may display relevant information (notes) stored in one or more Evernote databases of a visitor. In another embodiment, the website content 130 of the website 100 may be modified and/or otherwise enhanced according to notes. If the system described herein determines that the visitor has one or more notes which are related, or otherwise relevant to, the current website, the system may notify the visitor by: (1) automatically modifying the displayed website content 130 of the site in the visitor's web browser by including summary information and links to the visitor's personal notes inside of the public site; (2) displaying a popup window with the summary information and links, and/or (3) displaying a status message or indicator in connection with one or more of the site memory buttons that alerts the visitor that relevant notes are present and allowing the visitor to click on the button to then display the relevant notes.

As further discussed elsewhere herein, in connection with an Internet search (e.g., Google search) by the user using a public search engine, if the public web site displays the search results (website content 130) from the Google search, and/or any other search engine, the system described herein may automatically run the query (that was used to produce the public search results) against the visitor's private notes stored via Evernote (and/or another service or the visitor's local documents). This has the effect of notifying a visitor of any personal or private information that the visitor may have previously "remembered" (stored in Evernote or another service or in a local document) about whatever topic is being searched for by the visitor.

Figure 2:
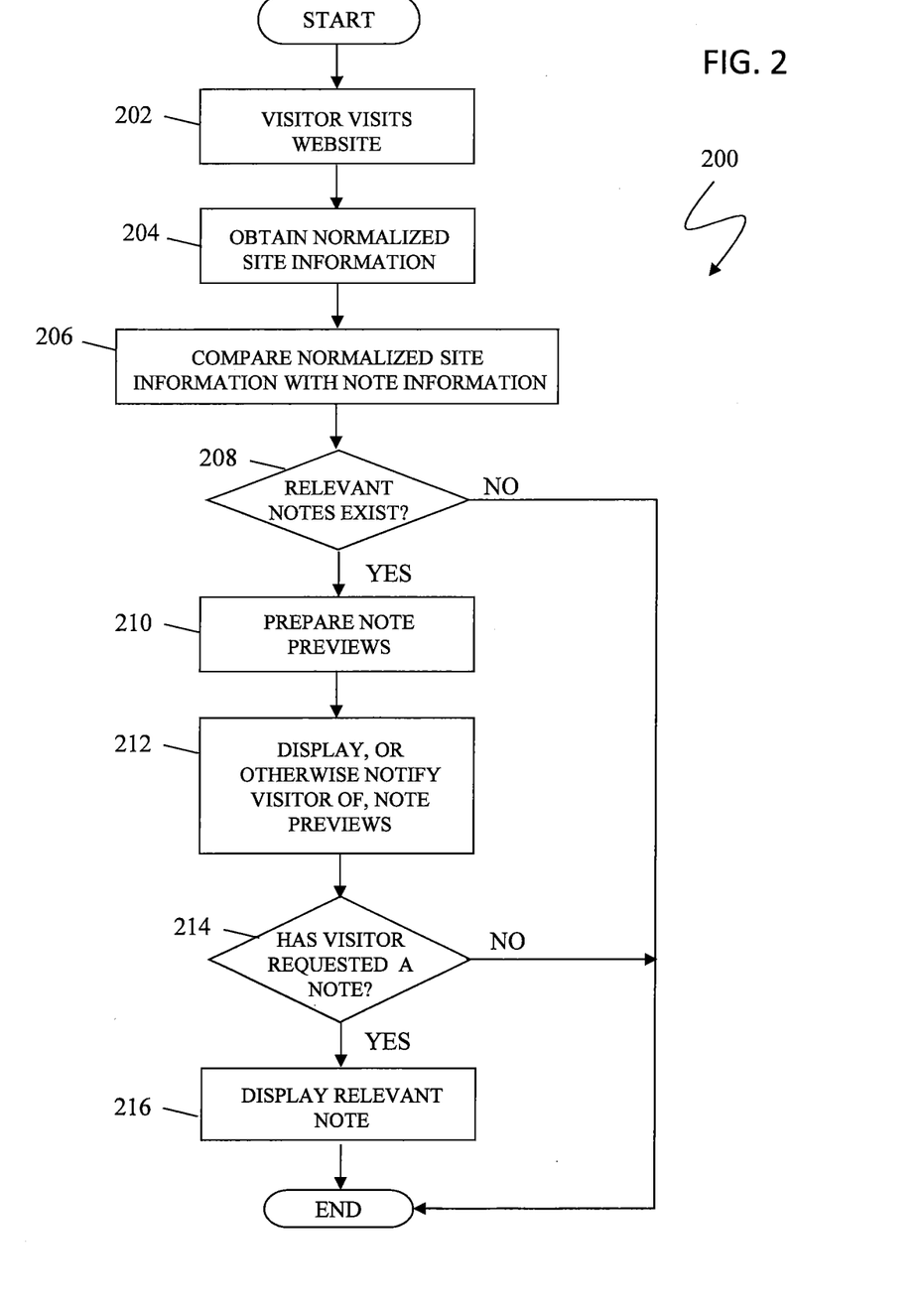
FIG. 2 is a flow diagram showing processing in connection with site memory according to an embodiment of the system described herein.

FIG. 2 is a flow diagram 200 showing processing in connection with site memory according to an embodiment of the system described herein. At a step 202, a user (visitor) visits a website using a browser. After the step 202, processing proceeds to a step 204 where normalized site information, such as a normalized site URL (and/or other appropriate address format), may be obtained and parsed from the browser address field. For example, for a URL in the format http[s]://[subdomain].domain.tld/path or http[s]//www.domain.tld, the path names following tld (top level domain) may be stripped off, leaving the relevant domain information in the normalized site URL format. It is noted that the site memory processing may be performed automatically when the visitor visits the website and/or may be activated by a visitor in some manner (e.g., by an initial click on the extension button 110, the embedded site memory button 112 and/or via some other appropriate mechanism).

After the step 204, processing proceeds to a step 206, where the normalized site URL format may be compared with stored note information, such as source URL information from notes (and/or other appropriate information) stored in one or more databases via Evernote and/or other similar service. This comparison may involve searching the one or more databases maintained by the Evernote service with previously-stored notes. The source URL information may be attributed to notes clipped from webpages and may find all notes related to (clipped from) visited websites. Additional features of the clipping process are further discussed elsewhere herein. In other embodiments, the system described herein may identify relevant notes by checking if common keywords appear on both the site and the note, and by checking if other people who have previously visited the site also have similar notes. In an embodiment, the above-noted steps may be performed automatically when the visitor visits the website. In another embodiment, the above-noted steps may be activated by the visitor, for example, by initially clicking on the button 110 and/or the button 112 and/or via another appropriate activation action by the visitor.

After the step 206, processing proceeds to a test step 208 where it is determined whether relevant notes exist in response to the searching and comparison processing. If not, then processing is complete. Otherwise, if relevant notes are determined to exist, then processing proceeds to a step 210 where note previews may be prepared for the relevant notes. In an embodiment, the note previews may include thumbnails of rendered notes, snippets or summaries of note contents, links to full notes in online notebooks and/or other appropriate note preview presentation.

After the step 210, processing proceeds to a step 212 where it is indicated that site memory functions are available or provided by displaying note previews and/or otherwise notifying the visitor of the note previews. In various embodiments, the visitor may be notified of note previews by displaying the note previews in connection with the content of the website being displayed, displaying in a popup window and/or may be presented in connection with a notification involving one or more of the site memory buttons. For example, for displaying involving use of the extension button 110, the extension button 110 may be changed in some appropriate manner to indicate that note previews for the current website are available, one example being displaying a "balloon" with the count of the relevant notes in proximity to the button 110. In another embodiment, the visitor may be notified of the existence of note previews by modifying the content of the website that the visitor is visiting by incorporating the note preview information into the displayed content of the current website. Additionally, the visitor may be notified of the existence of the note previews by display of note preview information in a popup window.

It is noted that in other embodiments, the steps 212 and 210 may be modified and performed in a different order. For example, a visitor may be notified that relevant notes exist, and that note preview information may be provided on request, such as by a change in one or more of the site memory buttons indicating the presence of notes. Upon request (click) by the visitor, the note preview information for the relevant notes may then be prepared and displayed.

After the step 212, processing proceeds to a test step 214 where it is determined whether the visitor has requested a note, for example, by clicking on a note preview item. For example, the visitor may be determined to have clicked on a note preview item presented in connection with modified content displayed on the current website, clicking on the popup window and/or may be determined to have clicked on the extension button 110 that notified the visitor of the existence of note previews. If clicking on the extension button 110, the visitor may then further click on one or more of the note preview items that are then listed. If it is determined that the visitor has not clicked on any note preview item, then processing is complete. Otherwise, if it is determined that the visitor has clicked on a note preview item, then processing proceeds to a step 216 where a relevant note, corresponding to the selected note preview, is retrieved from the Evernote database and displayed to the visitor. After the step 216, processing is complete.

Figure 3:
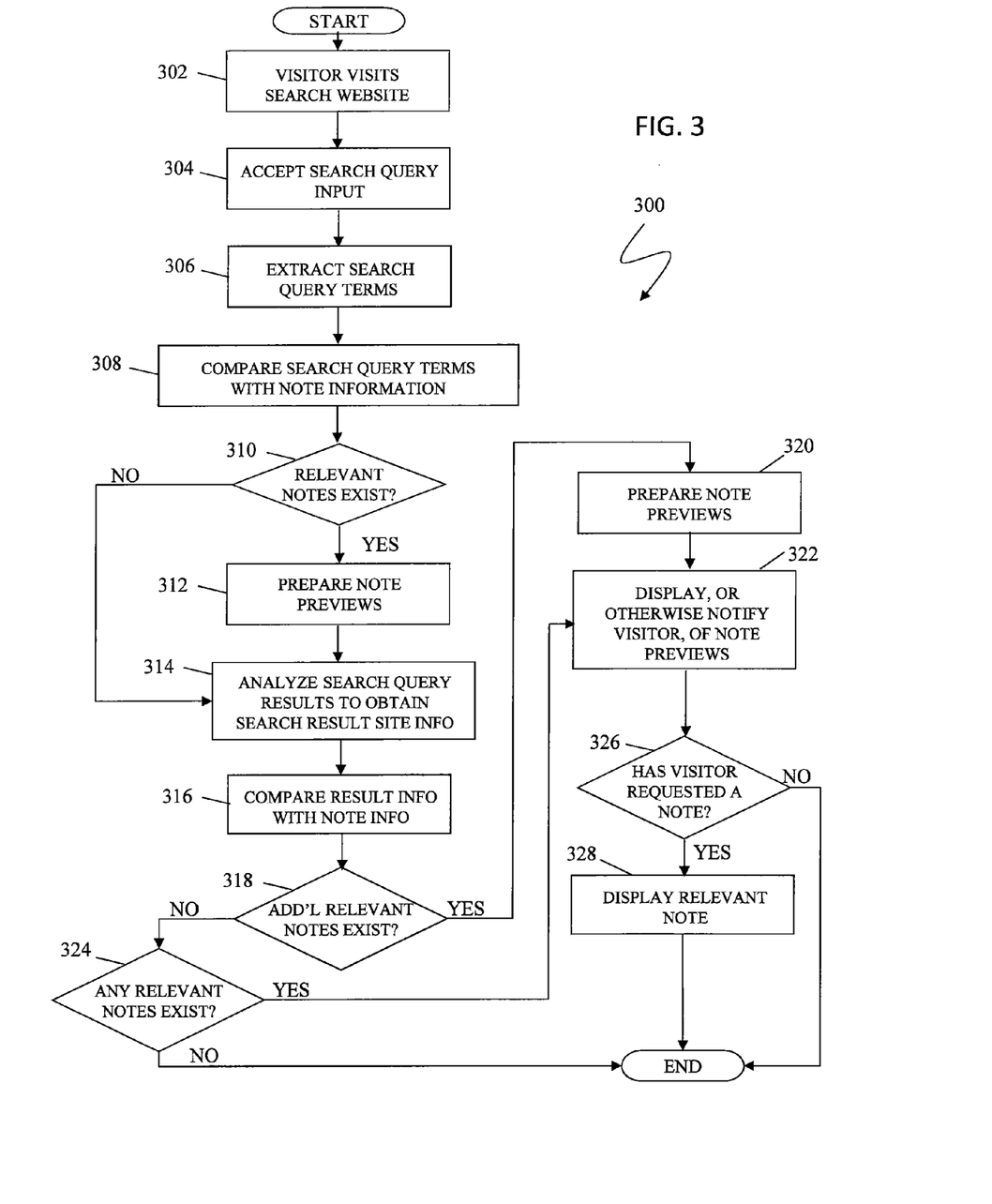
FIG. 3 is a flow diagram showing processing of the system described herein in connection with enhanced Internet searching techniques according to an embodiment of the system described herein.

FIG. 3 is a flow diagram 300 showing processing of the system described herein in connection with enhanced Internet searching techniques according to an embodiment of the system described herein. At a step 302, a user (visitor) visits a search site, such as Google, Wikipedia and/or other Internet search engine website, using a browser and/or other appropriate Internet search feature. After the step 302, processing proceeds to a step 304 where the browser accepts as input a search query. In various embodiments, the search query may be entered by the visitor and/or may be provided by another site from which the visitor has linked to the search site. After the step 304, processing proceeds to a step 306 where the system extracts the visitor's search query terms from the browser address field. Parsing URLs for search queries may take into account browser and search engine specific formats for online queries. After the step 306, processing proceeds to a step 308 where information corresponding to stored notes in Evernote (and/or other similar service) may be searched and compared with the extracted search query terms. Evernote may find notes by regular keyword searches in text notes and from typed and handwritten text present in images, digital ink notes, etc. using, for example, known Optical Character Recognition (OCR), Intelligent Character Recognition (ICR) or Natural Handwriting Recognition (NHR) techniques and/or other known data extraction techniques.

After the step 308, processing proceeds to a test step 310 where it is determined whether relevant notes in Evernote exist that correspond to the extracted search query terms. If not, then processing is complete (and, for example, the search engine displays its normal, unmodified public search query results). If at the test step 310 it is determined that relevant notes exist, then processing proceeds to a step 312 where note previews are prepared for the relevant notes. In various embodiments, note preview information may include summary of notes, snippets of note content, thumbnail images of notes, etc. After the step 312, processing proceeds to a step 314 where the normal, unmodified public search query results from the search engine are analyzed. The analysis may include extracting URLs of pages, e.g., normalized URLs, as further discussed elsewhere herein. After the step 314, processing proceeds to a step 316 where the search result extracted information, such as normalized URLs, are compared to note information, such as source URLs of the visitor's stored notes in Evernote (see, e.g., FIG. 2).

After the step 316, processing proceeds to a test step 318 where it is determined whether the comparison of the search result extracted information with the Evernote note information indicates that additional relevant notes exist (additional to that identified, if any, in the test step 310). If additional relevant notes are determined to exist then processing proceeds to a step 320 where note previews are prepared for the additional relevant notes. After the step 320, processing proceeds to a step 322 where the visitor is notified of the note previews. In various embodiments, the visitor may be notified of note previews by displaying the note previews in connection with modification of the content of the search results being displayed, via a popup window and/or may be presented in connection with a notification involving one or more site memory buttons. For example, relevant notes for the search may be made available and/or may include altering the content of the search result page to provide links to relevant notes next to search result listings. Additionally and/or alternatively, for displaying involving use of one or more dedicated buttons, such as the extension button 110, the extension button may be changed to indicate that note previews for the search results are available.

If, at the test step 318, it is determined that no additional relevant notes exist, then processing proceeds to a test step 324 where it is determined whether any relevant notes exist for the search query (i.e. were relevant notes determined to exist at test step 310). If not, then processing is complete. If so, meaning that relevant notes were determined to exist at the test step 310, then processing proceeds to the step 322 where the visitor is notified of the note previews as discussed.

After the step 324, processing proceeds to a test step 326 where it is determined whether the visitor has clicked on the note preview information (e.g. relevant note links) in the search result content and/or on the extension button 110 on the webpage. In various embodiments, the determination may be made in connection with multiple clicks by the visitor, for example, initially clicking the extension button 110 when notified that relevant notes exist, followed by one or more additional clicks to click on links to specific relevant notes. If it is determined that the visitor has not clicked on note preview information and/or the site memory button, then processing is complete. Otherwise, if the visitor clicks on the note preview information and/or site memory button then processing proceeds to a step 328 where the relevant notes may be retrieved from the Evernote database and displayed to the visitor. After step 328, processing is complete.

In various embodiments, use of the embedded button may also be provided in connection with revenue generation and sharing schemas. For example, after clicking on the embedded site memory button 112, the visitor may need to sign into their Evernote account. If the visitor does not have an Evernote account, the visitor may create one from within the popup. Multiple Evernote account options may be available to visitors, including subscription accounts (e.g., premium accounts) and, if the visitor signs up for a subscription service version of Evernote from the site memory button, the site owner may be given a portion of the subscription fee paid by the user. Other revenue generation options are possible.

In another embodiment, the system described herein may provide for clipping control by a site owner of a website who may control aspects of what information is clipped by a visitor that activates a clipping process for a website using Evernote (and/or other similar service). For example, through the control of an embedded on-site clipping button on the website, the site owner may control precisely what is saved into a visitor's Evernote account upon activation of the embedded button by the visitor. The embedded on-site clipping button may be the same as, or a different button from, the site memory button 112 that has been previously discussed elsewhere herein. Accordingly, in various embodiments, the same button may function to provide both the site memory features discussed herein as well as the content clipping features, and may include one or more selection features or options that may be provided for the visitor to select whether site memory searching functions or content clipping functions (or both) are being requested. Alternatively, in other embodiments, multiple buttons may be used and may be located on the same or different portions of the website. For example, site memory buttons may be embedded next to a snippet of each article on a blog's index page.

In an embodiment, as part of the button customization for content clipping functions, the site owner may define what region of a page is clipped and the title of the resulting note. The site owner may suggest tags to accompany the note, as well as the organization schema, such as a destination notebook, for the clip. The site owner may even provide the clips with automatic headers, footers, links, and attributions that allow the pages clipped from the website to be presented and displayed in an advantageously controllable manner, as further discussed elsewhere herein.

Figure 4:
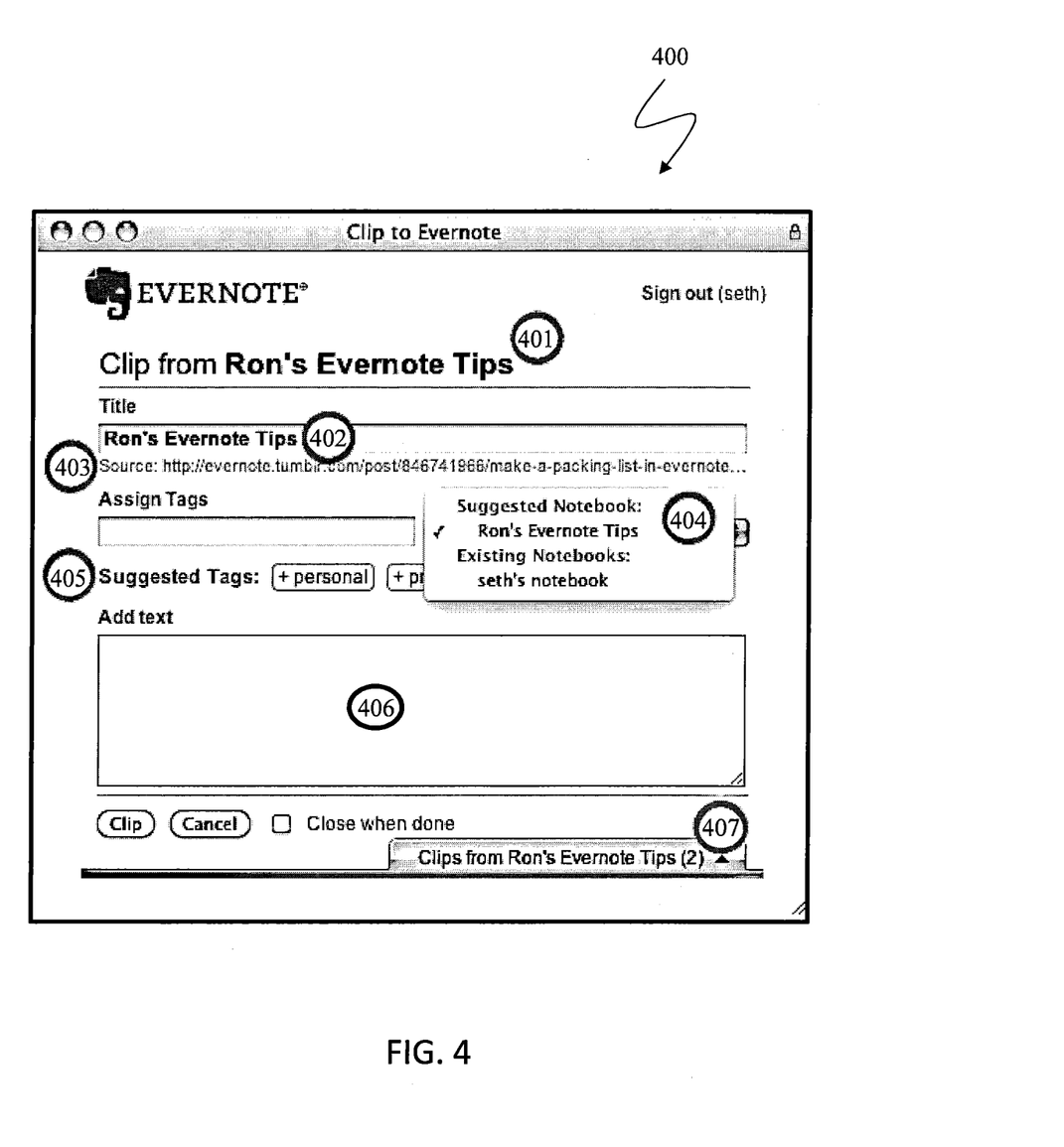
FIG. 4 is a schematic illustration showing a popup window that is opened when a visitor clicks the embedded site memory button and for which the result from a clip has been controlled by the site owner of the website according to an embodiment of the system described herein.

FIG. 4 is a schematic illustration showing a popup window 400 that is opened when a visitor clicks the extension button 110 (and/or other browser based or embedded clipping button, if different from the extension button or icon, such as an embedded clipping and/or site memory button 112) and for which the result from a clip has been controlled by the site owner of the website according to an embodiment of the system described herein. The popup 400 may serve at least two functions. First, the popup may let the visitor clip a page of the website, as further described elsewhere herein. Second, the popup may show visitors everything they have ever clipped from the same domain. Visitors may browse through a summary list of their favorite content from the website clipped previously. Even notes that were made using the browser extension, discussed elsewhere herein, prior to embedding the site memory button 112 on the page, may show up in the results.

The following describes specific embodiments for fields of the popup 400 that may include site owner controlled information along with options for the visitor to further customize the generated note following activation of the clipping process. Field 401 of the popup may indicate provider information, such as the name of the website being clipped. Field 402 may indicate a title of the new note that will be saved with the clipped content. The title may be already suggested, as controlled by the site owner, and may be the same as or different from the webpage title. The visitor may also type in a desired title of the note. Field 403 may show the source URL for the website being clipped; by customizing this field, the site owner may offer "permalinks" to notes that will sustain site changes even in cases where the visitor clips site content from "news" or "headline" pages. Field 404 may show a suggested location of the new note, such as proposing a new notebook and/or showing a visitor's saved notebook. Field 405 may allow the visitor to tag the note, such as personal and/or professional. The site owner may suggest predefined tags that may be listed in the popup window, which may be accepted by the visitor and/or may be overridden by the visitor. Field 406 may be a text field that allows the visitor to type in information describing the note to allow further customization by the visitor. Field 407 may be a tab and/or other mechanism for the visitor to view other clipped notes, such as other notes from the same domain. In accordance with the system described herein, the actual content that is clipped, and which is shown by a visitor subsequently accessing the note, may be controlled by the site owner, as further discussed elsewhere herein while the visitor may redefine other elements in the fields.

Figure 5:
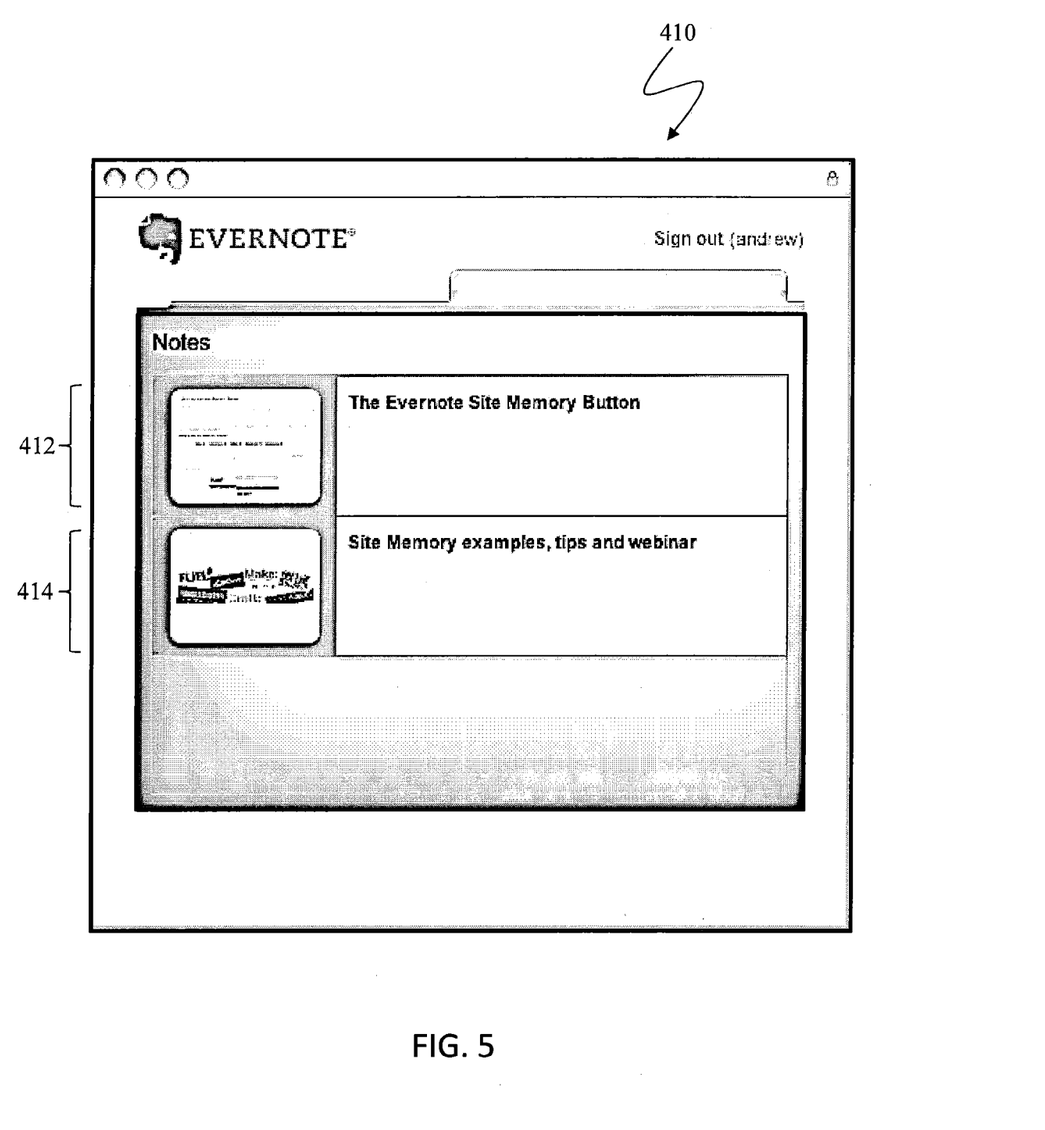
FIG. 5 is a schematic illustration of a popup window that shows relevant notes that may be selected by a visitor for display in accordance with an embodiment of the system described herein.

FIG. 5 is a schematic illustration of a popup window 410 that shows relevant notes that may be selected by a visitor for display in accordance with the system described herein. In the various embodiments discussed herein, the popup windows 410 may show examples of note previews that have been determined as relevant notes in accordance with the processes described elsewhere herein. For example, the popup window 410 may show note previews for notes clipped from a common domain and/or the popup window 410 may be the result of processing showing notes relevant to a current website visited by the visitor and/or by an Internet search performed by the user in accordance with the site memory processing described elsewhere herein. As shown the popup window may include note previews 412, 414 that include thumbnail images, text and/or other identifying information of relevant notes. By clicking on the previews 412, 414, the associated relevant notes may then be displayed.

In accordance with the system described herein, it is noted that the ability to associate a visitor's past notes with a newly visited web site may be particularly advantageous when the visitor clips content from the website and explores its relation with other content, including other relevant notes and past content clipped from the same site or same domain. This may be particularly useful in connection with shopping, research, entertainment and/or other types of frequently visited sites. Accumulation of site content, and appropriate associations of relevant notes between multiple sites, increases site relevance. Accordingly, in connection therewith, it is advantageous for a site owner to be able to control what content is clipped, as further discussed elsewhere herein.

Figure 6:
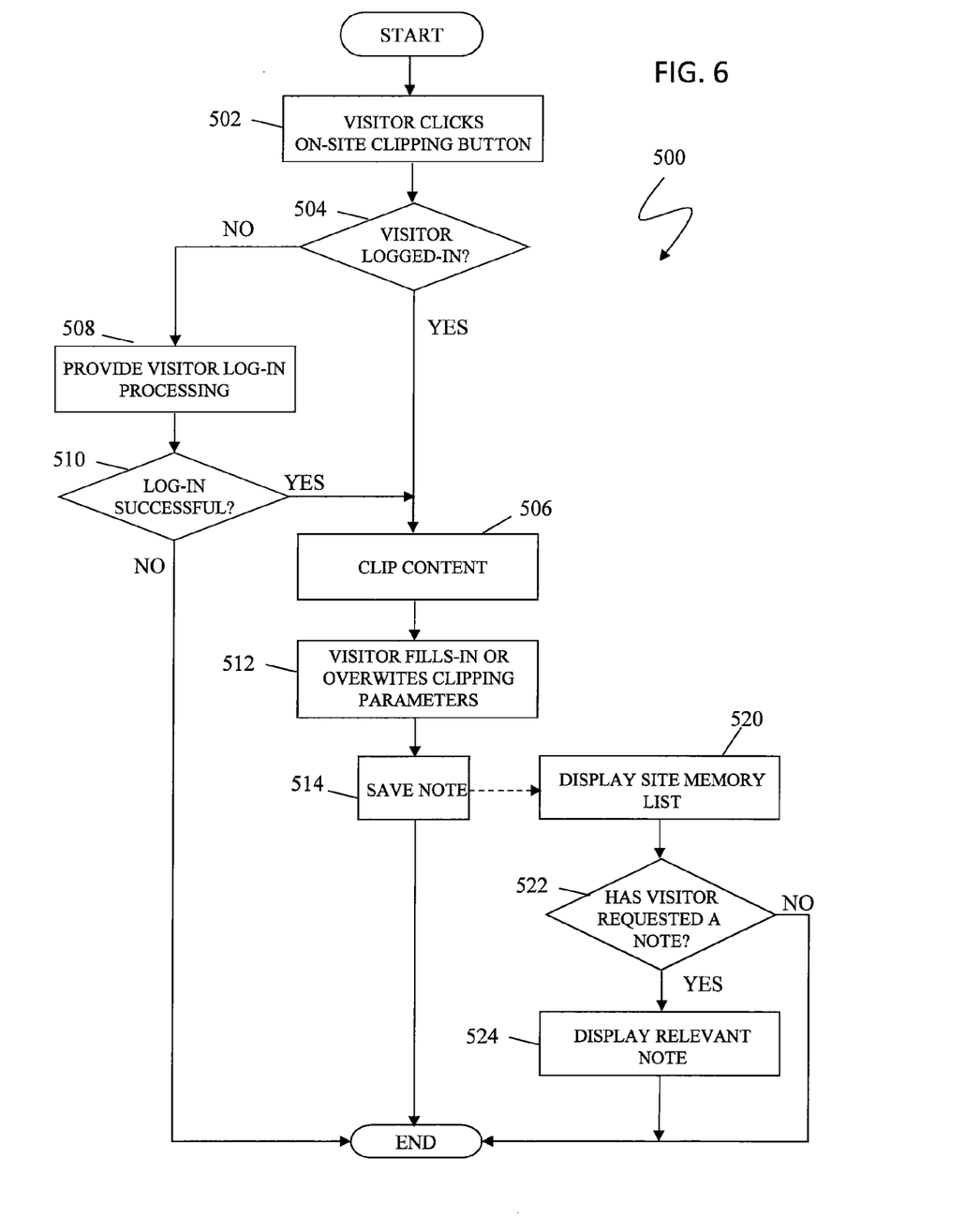
FIG. 6 is a flow diagram showing on-site clipping processing according to an embodiment of the system described herein in accordance with the controlling of clip content by a site owner of a website.

FIG. 6 is a flow diagram 500 showing on-site clipping processing according to an embodiment of the system described herein in accordance with the controlling of clip content by a site owner of a website. This particular embodiment represents the case when a visitor to the site is registered with the Evernote service and has an account and the corresponding login information. At a step 502, the system recognizes that a visitor has clicked an on-site clipping button on a website (e.g., the embedded button 112). After the step 502, processing proceeds to a test step 504 where it is determined whether the visitor is logged into an Evernote account (and/or similar service account). If so, then processing proceeds to a step 506 where page content is clipped as defined by the site owner, for example in a script. The site owner may pre-define various clip parameters, such as title, associated URL, site title, suggested notebook name and tags and even replicate existing content tags (notebooks and tags may be created, if absent), location, style etc., as further discussed elsewhere herein. Omitted parameters may be filled in with default values and/or left to the visitor (user) to complete. The visitor may be able to override most parameters, although, in an embodiment, a visitor may not be able to override the choice of content controlled by the owner/publisher.

If, at the test step 504, it is determined that the visitor is not logged into an Evernote account, then processing proceeds to a step 508 where the visitor is provided with information to log-in to Evernote. After the step 508, processing proceeds to a test step 510 where it is determined whether the log-in was successful. If not, then processing is complete. If so, then processing proceeds to the step 506 where the content for the desired page is clipped.

After the step 506, processing proceeds to a step 512 where the visitor fills in and/or overwrites clipping parameters (such as title, notebook, customized text etc.). After the step 512, processing proceeds to the step 514 where the new note is saved in a database of the Evernote service. After the step 514, processing is complete.

In an alternative embodiment, after the step 514 processing may proceed to a step 520 where a site memory list with note previews for relevant notes of the clipped content for the current webpage, including the new note, may be displayed to the visitor in connection with site memory processing like that further described elsewhere herein. After the step 520, processing proceeds to a test step 522 where it is determined whether the visitor has requested site memory by clicking on a note preview item of the site memory list. If not, processing is complete. If so, then processing proceeds to a step 524 where the relevant note, for the note preview clicked on by the visitor, is displayed to the visitor. After the step 524, processing is complete.

Figure 7:
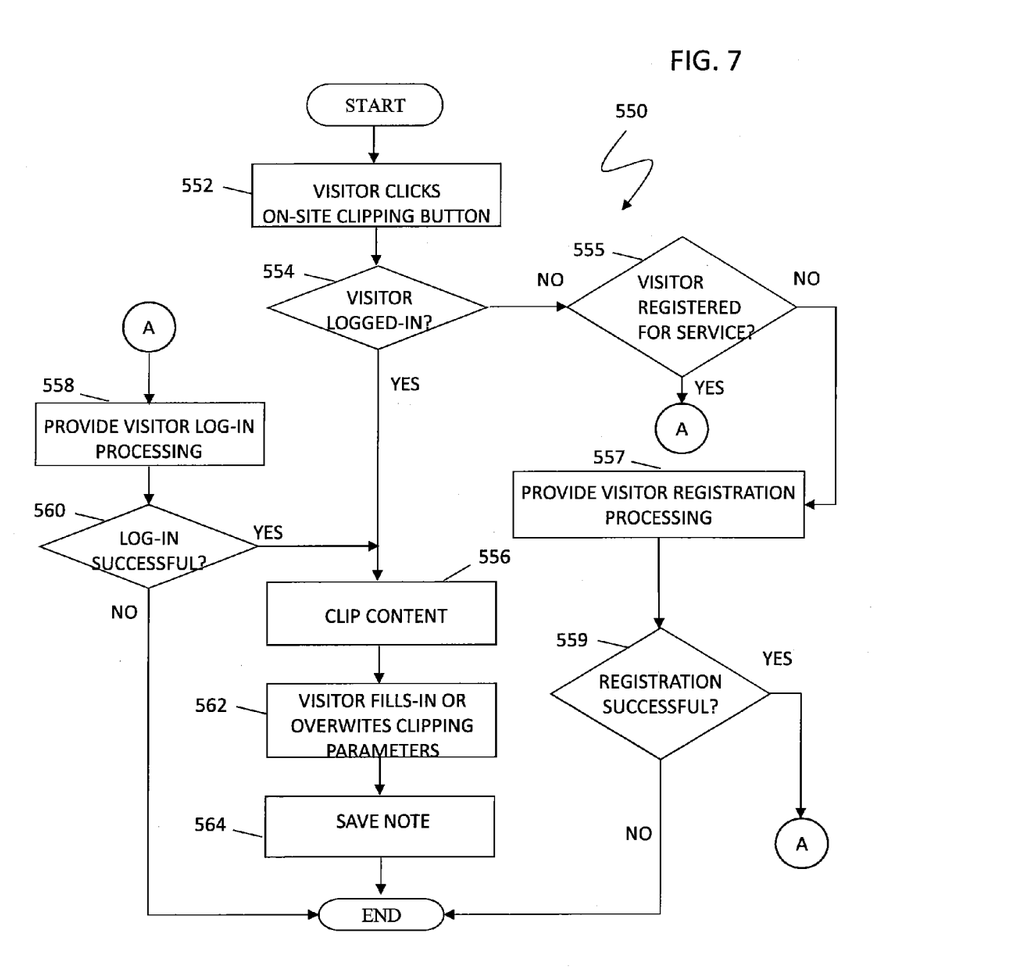
FIG. 7 is a flow diagram showing another embodiment for on-site clipping processing including visitor registration processing according to the system described herein.

FIG. 7 is a flow diagram 550 showing another embodiment for on-site clipping processing including visitor registration processing according to the system described herein. At a step 552, the system recognizes that a visitor has clicked an on-site clipping button on a website (e.g., the embedded button 112). After the step 552, processing proceeds to a test step 554 where it is determined whether the visitor is logged into an Evernote account (and/or similar service account). If so, then processing proceeds to a step 556 where page content is clipped as defined by the site owner, for example in a script. The site owner may pre-define various clip parameters, such as title, associated URL, site title, suggested notebook name and tags and even replicate existing content tags (notebooks and tags may be created, if absent), location, style etc., as further discussed elsewhere herein. Omitted parameters may be filled in with default values and/or left to the visitor (user) to complete. The visitor may be able to override most parameters, although, in an embodiment, a visitor may not be able to override the choice of content controlled by the owner/publisher.

If, at the test step 554, it is determined that the visitor is not logged into an Evernote account, then processing proceeds to a test step 555 where it is determined whether the visitor is registered with Evernote. If so, then processing proceeds to a step 558 (flow processing shown using the connector with the letter "A") where the visitor is provided with information and prompts to log-in to Evernote. After the step 558, processing proceeds to a test step 560 where it is determined whether the log-in was successful. If not, then processing is complete. If so, then processing proceeds to the step 556 where the content for the desired page is clipped.

If, at the test step 555 it is determined that the visitor is not registered with Evernote, then processing proceeds to a step 557 where the visitor registration processing provides the visitor with information and prompts to register with Evernote. It is noted that this feature may be used in connection with revenue generation schemas for site owners as further discussed elsewhere herein. After the step 557, processing proceeds to a test step 559 where it is determined whether registration was successful. If so, then processing proceeds to the step 558 for logging-in the visitor. If registration is not successful, then processing is complete.

After the step 556, processing proceeds to a step 562 where the visitor fills in and/or overwrites clipping parameters (such as title, notebook, customized text etc.). After the step 562, processing proceeds to the step 564 where the new note is saved in a database of the Evernote service. After the step 564, processing is complete. It is also noted that alternative processing, like that shown by steps 520, 522 and 524 in the flow diagram 500 of FIG. 6, may also be performed in connection with the processing of flow diagram 550.

Figure 8:
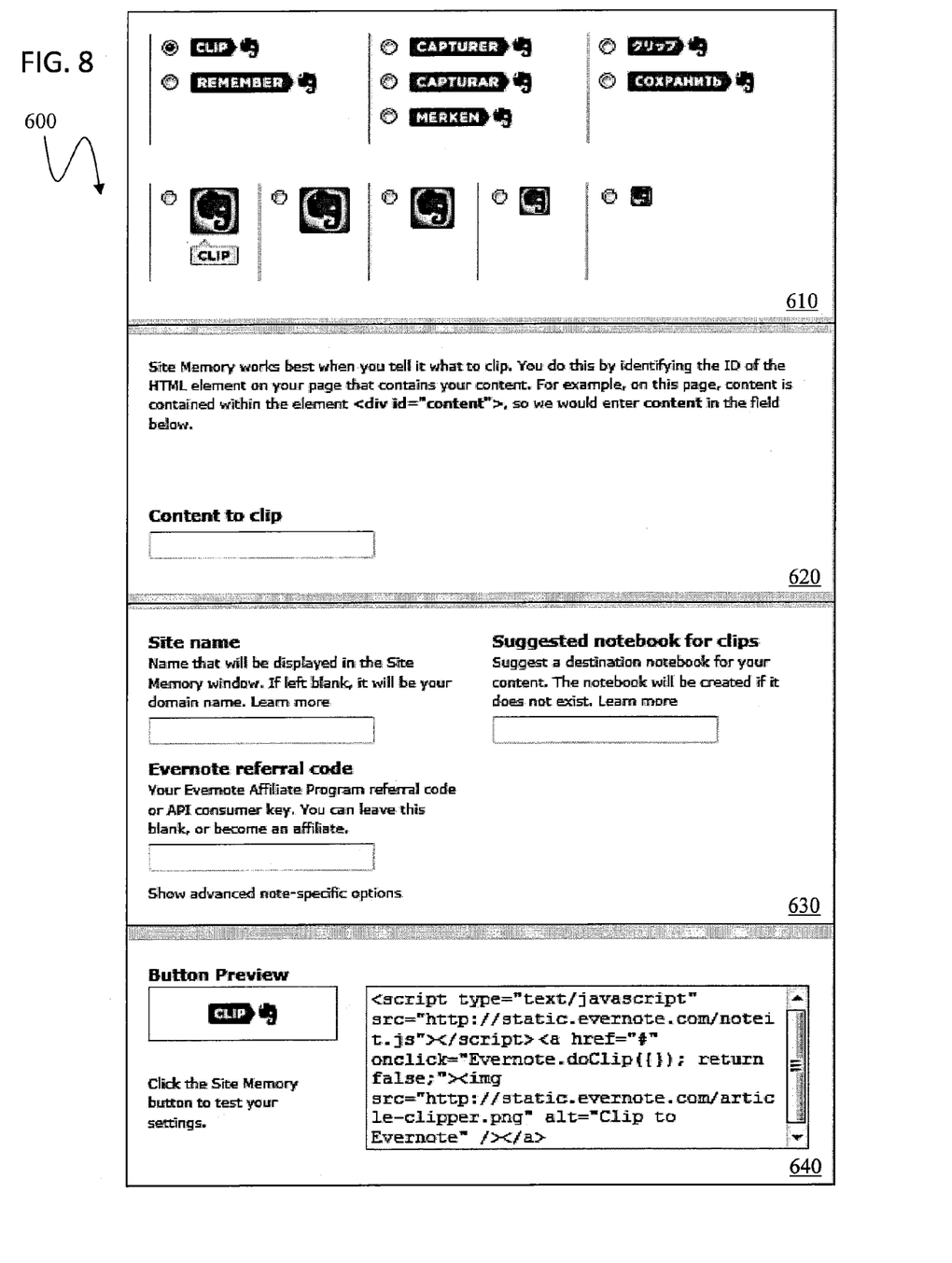
FIG. 8 is a schematic illustration showing a button builder template for use by a site owner of a website to control features and identification of content that is clipped into a note when a visitor activates on-site clipping processing according to an embodiment of the system described herein.

FIG. 8 is a schematic illustration showing a button builder template 600 for use by a site owner of a website to control features and identification of content that is clipped into a note when a visitor activates on-site clipping processing according to an embodiment of the system described herein. The button builder template 600 may be used to create button code for an embedded button (see e.g., embedded button 112 and/or other on-site clipping button) that is to be clicked on by a visitor in connection with activation of on-site clipping processing.

Field 610 of the button builder template 600 shows image options for the image to be used for the site memory button/on-site clipping button. Image and text associated with the image may be used. The site owner of the website may select a desired image/text for the button. Field 620 allows for the site owner to identify the content that is to be clipped. As discussed herein, the site owner may control what content is clipped in response to a visitor's activation of site memory processing. The site owner may enter the appropriate content address information into the "Content to clip" field. Field 630 allows the site owner to specify a site name that will be displayed in the site memory window. If left blank, the page title of the webpage where the site memory button is embedded may be the default. Field 630 further enables the site owner to specify a suggested notebook location for the clips and allows identification of a referral code that may be used to identify the site owner with Evernote and may be used in connection with revenue generation for the site owner, as further discussed elsewhere herein. Field 640 enables the site owner to test the settings entered and see an example of a note clipped from the website according to the controlled settings.

Filling out the Content field 620 in the site memory button builder template provides control of the quality of clips that will be produce by a visitor clipping a website. If no content is specified for a clip, by default, a link to the webpage may be saved as a note without saving actual content. By specifying which content to clip, a more useful result providing actual content in the resulting note may be controlled. One way to provide appropriate control of what to clip after the site memory button is activated by a visitor is to set the content ID when building the embedded site memory button. The content ID is the ID of a container on a webpage, such as a <div>, that contains the content that the site owner desires to be clipped. The content ID may differ from site to site, as desired. For example, the main page content may be a container called <div id="content">, so that content may easily be put into the Content ID field. For blog posts, a container may be used that wraps an individual post. The container may already have a unique ID, such as <div id="post-xyz-content">, where xyz relates to the specific post.

In an embodiment, in connection with the field 620 for controlling the content to clip, main content that will be clipped from a page may be controlled by using one of content, contentId or contentUrl parameters. The content parameter may be a string or document object model (DOM) element containing the content to be clipped. The contentId parameter may be the ID of the HTML element containing the content to be clipped, for example, a <div>. The contentUrl parameter may be a URL from which site memory will retrieve the content to be clipped. The content may be retrieved using, e.g., AJAX (the acronym for asynchronous JavaScript and XML), so standard AJAX restrictions may apply. This option may be very useful for cases where page format is already available that is suitable for clipping, such as a printable view.

In addition to the main content, it is also possible, in various embodiments, to add a signature, header and/or footer to the clipped note using the signature, header and footer parameters. A signature is a string or DOM element containing a signature that will be appended to the main content of the clip, separated by a horizontal rule. A header is a string or DOM element containing a header that will be prepended to the main content. A footer is a string or DOM element containing a footer that will be appended to the main content, following the optional signature. Unlike signature, footer will not be separated by a horizontal rule.

It is noted that site memory processing may be completely static until the visitor clicks on the button, so that page loads will not be slowed down. In an embodiment, site memory content may be distributed using a service, such as, for example, via Amazon CloudFront, so the visitor's browser may not make a request to an actual Evernote server until the visitor clicks on the site memory button. Other options for optimizing performance include: only include the Site Memory JavaScript library once; include the JavaScript library at the bottom of pages so that it loads last; and/or load a minified JavaScript library by changing the script source URL.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for using a processor to control information stored in response to a content clipping process on a website, the method comprising:

configuring an embedded button on the website that activates the content clipping process when the button is actuated by a visitor to the website, wherein the embedded button is presented on the website independently of the user interacting with the website;

configuring at least one parameter associated with the embedded button, wherein the at least one parameter includes a content parameter for identifying content on the website in response to activation of the content clipping process, the content being stored in a presentable form in a database that is provided as a plurality of personal notes previously stored and maintained by the visitor; and executable code provided at the website causing at least some content on the website, different from the URL of the website, to be stored in a presentable form in response to actuating the embedded button, the content that is stored including content on the website that is independent of the embedded button.

2. The method of claim 1, wherein the presentable form of the content on the website that is identified in response to activation of the content clipping process is controlled by a site owner of the website by controlling the at least one parameter.

3. The method of claim 1, wherein the database is maintained by a service to which a visitor to the website subscribes.

4. The method of claim 3, wherein the visitor activates the embedded button on the website to activate the content clipping process and store the presentable form of the content in the database.

5. The method of claim 4, wherein the presentable form of the stored content in the database is subsequently accessible by the visitor.

6. The method of claim 1, wherein the at least one parameter further includes a parameter for organizing the content in the presentable form that is stored in the database.

7. The method of claim 1, wherein configuring the button includes configuring visual characteristics of the button.

8. The method of claim 1, wherein the presentable form of the content is the same as a printable view of the content.

9. The method of claim 1, wherein the at least one parameter includes the content parameter and at least one other parameter for organizing the content.

10. The method of claim 9, wherein the at least one other parameter is controllable by a visitor to the website, and wherein the content parameter is exclusively controlled by a site owner of the website.

11. A non-transitory computer readable medium storing software for controlling information stored in response to a content clipping process on a website, the software comprising:
executable code that configures an embedded button on the website that activates the content clipping process when the button is actuated by a visitor to the website, wherein the embedded button is presented on the website independently of the user interacting with the website;
executable code that configures at least one parameter associated with the button, wherein the at least one parameter includes a content parameter for identifying content on the website in response to activation of the content clipping process, the content being stored in a presentable form in a database that is provided as a plurality of personal notes previously stored and maintained by the visitor; and
executable code provided at the website that causes at least some content on the website, different from the URL of the website, to be stored in a presentable form in response to actuating the embedded button, wherein the content that is stored includes content on the website that is independent of the embedded button.

12. The non-transitory computer readable medium of claim 11, wherein the presentable form of the content on the website that is identified in response to activation of the content clipping process is controlled by a site owner of the website by controlling the at least one parameter.

13. The non-transitory computer readable medium of claim 11, wherein the database is maintained by a service to which a visitor to the website subscribes.

14. The non-transitory computer readable medium of claim 13, wherein the visitor activates the embedded button on the website to activate the content clipping process and store the presentable form of the content in the database.

15. The non-transitory computer readable medium of claim 14, wherein the presentable form of the stored content in the database is subsequently accessible by the visitor.

16. The non-transitory computer readable medium of claim 11, wherein the at least one parameter further includes a parameter for organizing the content in the presentable form that is stored in the database.

17. The non-transitory computer readable medium of claim 11, wherein configuring the button includes configuring visual characteristics of the button.

18. The non-transitory computer readable medium of claim 11, wherein the presentable form of the content is the same as a printable view of the content.

19. The non-transitory computer readable medium of claim 11, wherein the at least one parameter includes the content parameter and at least one other parameter for organizing the content.

20. The non-transitory computer readable medium of claim 19, wherein the at least one other parameter is controllable by a visitor to the website, and wherein the content parameter is exclusively controlled by a site owner of the website.

21. The method of claim 1, further comprising:
providing an indication of material previously clipped from the website.

22. The non-transitory computer readable medium of claim 11, further comprising:
executable code that provides an indication of material previously clipped from the website.

23. The method of claim 1, wherein the executable code provided at the website includes Java code.

24. The method of claim 11, wherein the executable code provided at the website includes Java code.

* * * * *